July 26, 1932. A. B. ESSELTINE 1,868,973
APPARATUS FOR HANDLING LOOSE MATERIAL
Filed Oct. 22, 1928 4 Sheets-Sheet 1
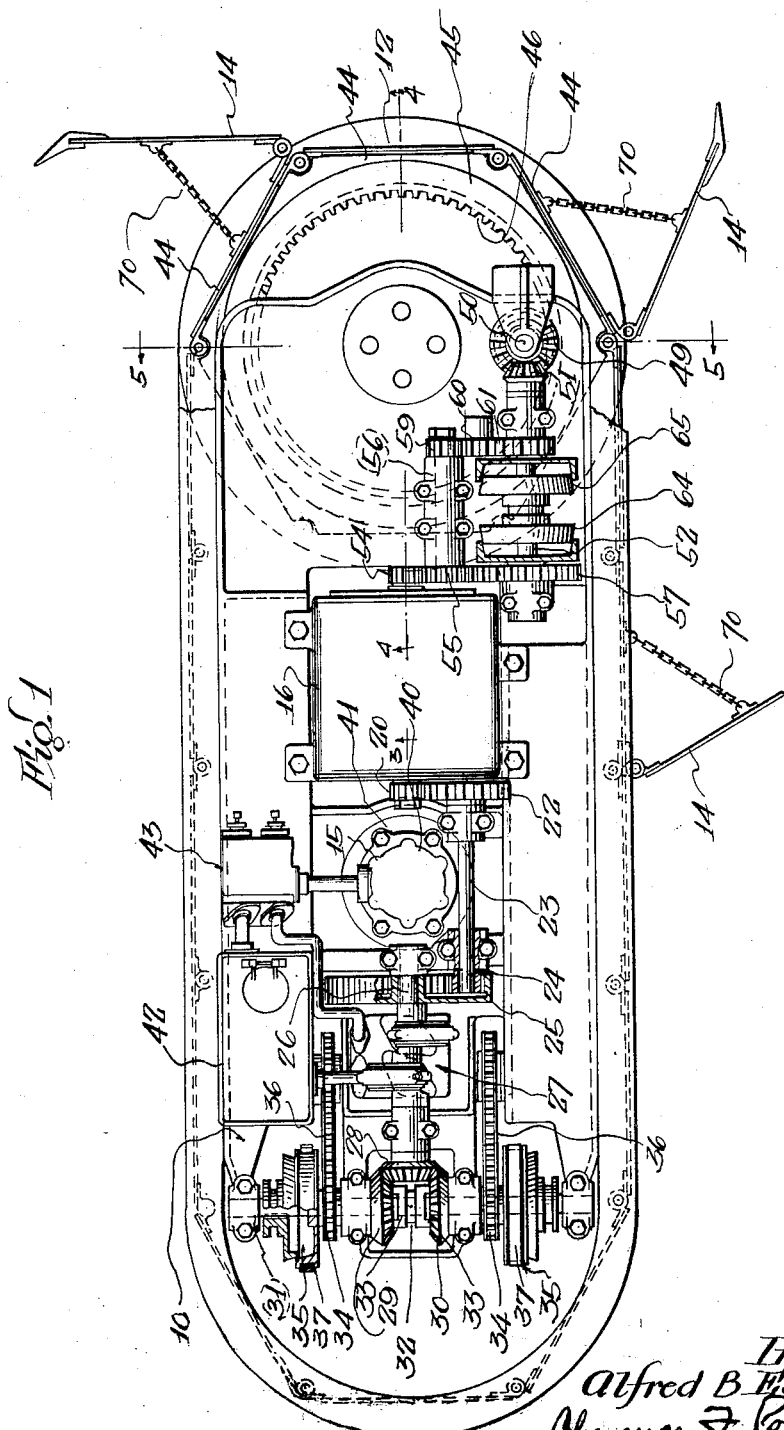
Inventor
Alfred B. Esseltine
Clarence F. Poole
Attorney July 26, 1932.  A. B. ESSELTINE  1,868,973
APPARATUS FOR HANDLING LOOSE MATERIAL
Filed Oct. 22, 1928   4 Sheets-Sheet 2
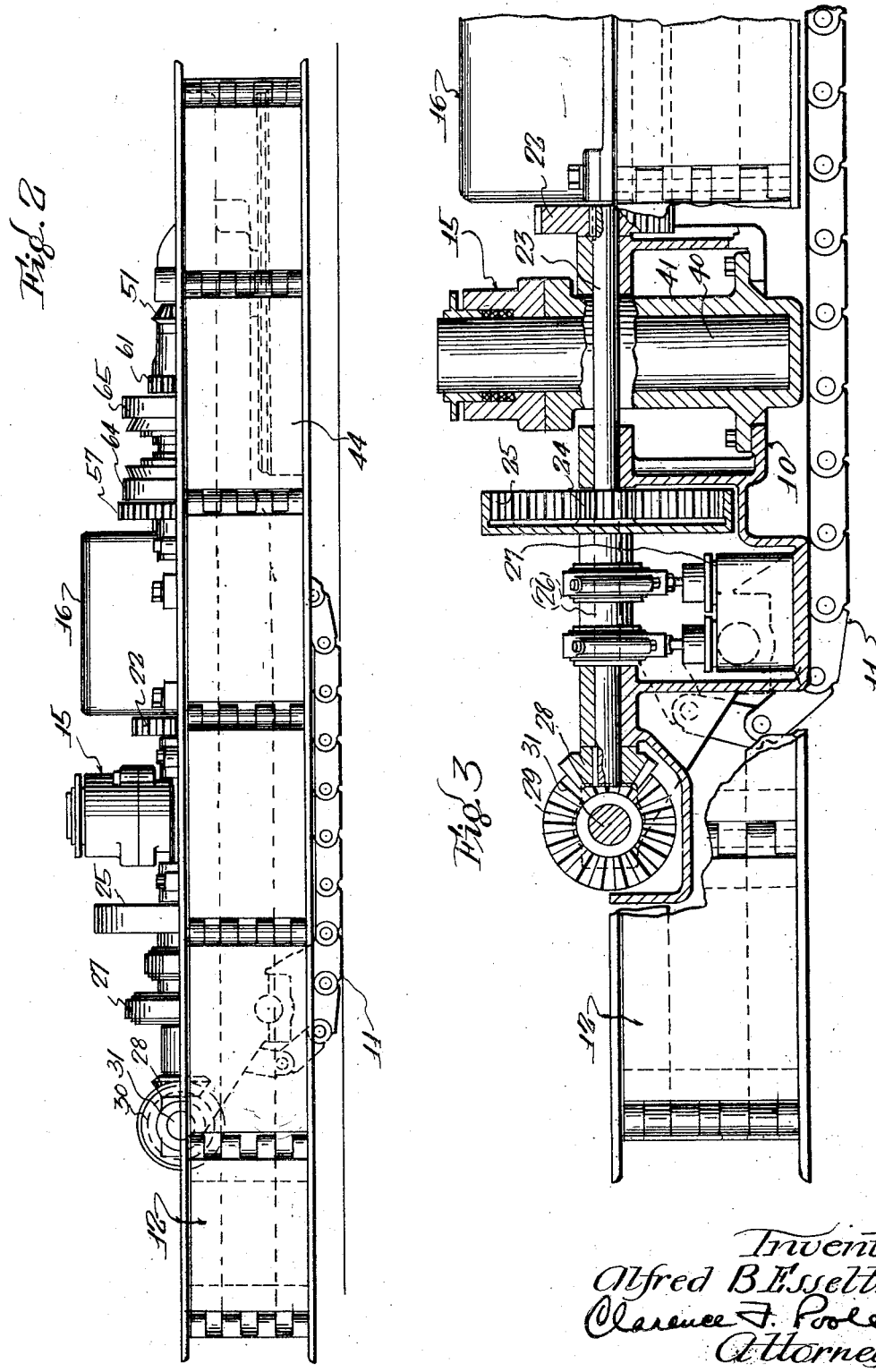

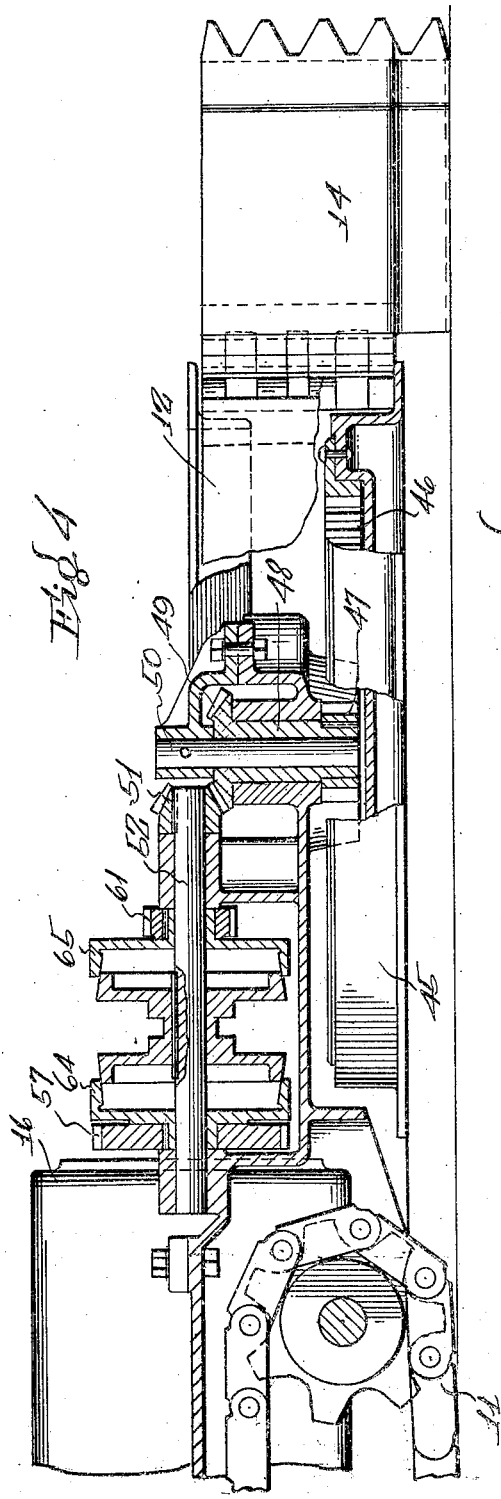
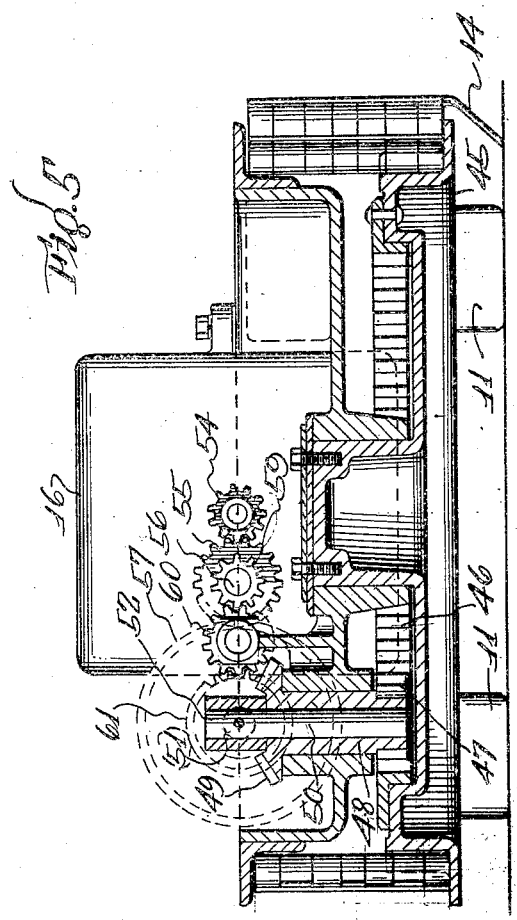

July 26, 1932.  A. B. ESSELTINE  1,868,973
APPARATUS FOR HANDLING LOOSE MATERIAL
Filed Oct. 22, 1928   4 Sheets-Sheet 4
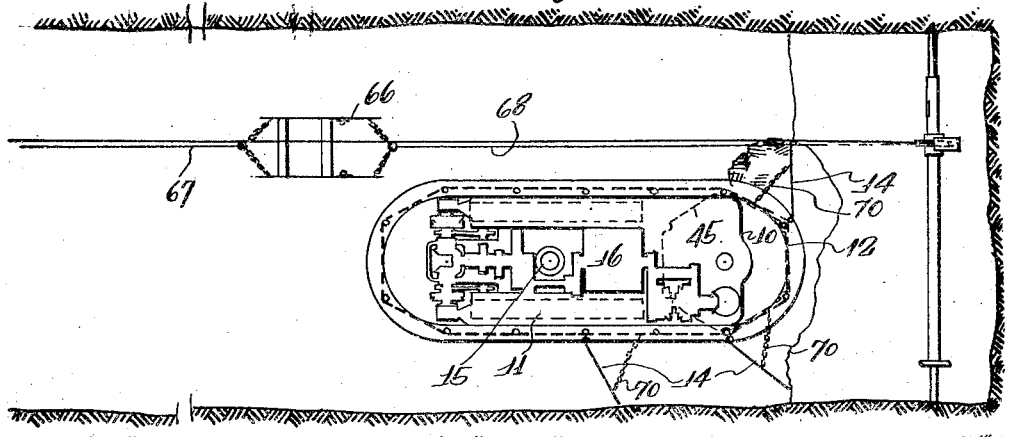
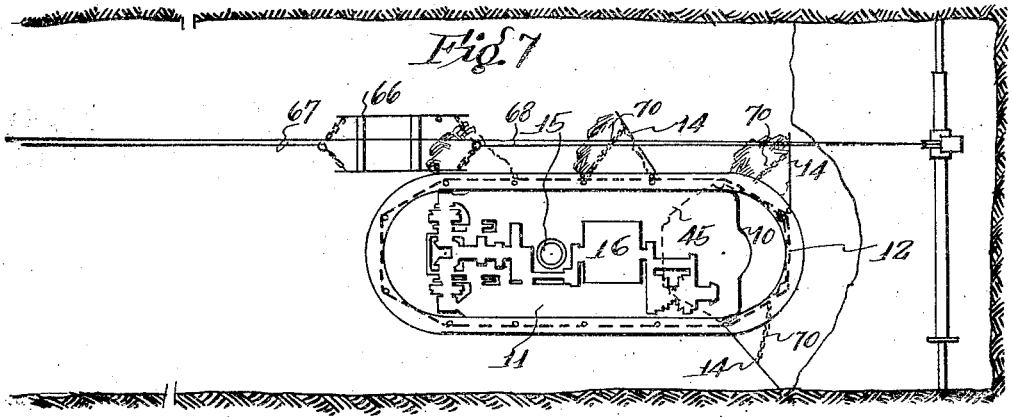
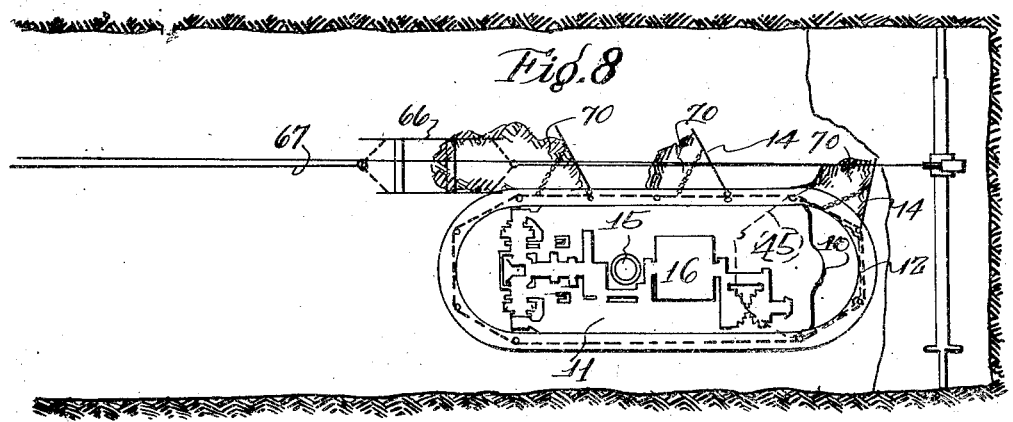
Inventor
Alfred B. Esseltine
Clarence F. Poole
Attorney Patented July 26, 1932

1,868,973

UNITED STATES PATENT OFFICE

ALFRED B. ESSELTINE, OF CHICAGO, ILLINOIS, ASSIGNOR TO GOODMAN MANUFACTURING COMPANY, OF CHICAGO, ILLINOIS, A CORPORATION OF ILLINOIS

APPARATUS FOR HANDLING LOOSE MATERIAL

Application filed October 22, 1928. Serial No. 314,007.

This invention relates to apparatus for handling loose material and has for its principal object to provide a new and improved apparatus of the class described especially adapted for use in entries or narrow rooms to gather loose material or mined coal from the coal face and move said material into a conveying apparatus or scraper or other suitable material transporting device.

In narrow work when a conveyor is used to transport the mined coal from the face to the entry, it has heretofore been necessary to load the conveyor by hand at the face, or when a scraper is used to transport the mined coal from the face to the entry, it has been necessary either to shovel the mined coal into the path of the scraper or to change the path of the scraper by moving the draft ropes so said scraper might engage said mined coal. My invention eliminates this hand operation and provides a self contained portable means for moving mined coal or any other loose material on to a conveyor or moving said loose material into the path of a scraper.

My invention may best be understood by reference to the following drawings wherein:—

Figure 1 is a top plan view of the device embodying my invention;

Figure 2 is a side elevation of the device shown in Figure 1;

Figure 3 is an enlarged fragmentary sectional view taken on line 3—3 of Figure 1;

Figure 4 is an enlarged fragmentary sectional view taken on line 4—4 of Figure 1;

Figure 5 is an enlarged sectional view taken on line 5—5 of Figure 1; and

Figures 6, 7 and 8 are diagrammatic top plan views of the device shown in Figure 1 showing the material gathering means in various stages of the loading operation.

Referring now in particular to the drawings, a main frame 10 is provided on continuous tread devices 11, 11, for moving said main frame about from working place to working place. A chain 12 surrounds the main frame and is reciprocably movable thereabout. The chain 12 has a plurality of material gathering paddles 14, 14, thereon, for gathering loose material and moving it along the main frame 10. A hydraulic jack 15 is provided to hold the main frame in a stationary position while gathering coal or other loose material. A motor 16, preferably shown as an electric motor, is provided to provide a means for moving the main frame 10 about from working place to working place, to reciprocably move the chain 12 about the main frame 10 and to operate pumping means for the hydraulic jack 15.

Referring now to the means for driving the continuous tread devices 11 from the motor 16:

The motor 16 has an armature pinion 20 on its rearward end which meshes with and drives a spur gear 22 keyed on one end of a horizontal shaft 23 extending longitudinally of the main frame 10. A pinion 24 on the opposite end of the shaft 23 meshes with and drives an internal gear 25. The internal gear 25 is keyed on a crank shaft 26 of a reciprocating hydraulic pump 27 to drive said pump.

The opposite end of the crank shaft 26 has a bevel gear 28 keyed thereto which meshes with and drives bevel gears 29 and 30 freely mounted on a transverse shaft 31 near the rearward end of the main frame 10 and selectively connectible therewith for driving said shaft in opposite directions by means of a jaw clutch 32 of the ordinary type. The jaw clutch 32 has clutch jaws 33 on each end thereof so as to engage clutch jaws on either of the bevel gears 29 or 30 to drive the shaft 31 in opposite directions and is operated by a suitable system of levers in the ordinary manner (not shown). Sprockets 34, 34, are freely mounted near opposite ends of the transverse shaft 31 and are driven thereby by a suitable friction clutch means herein shown as cone clutches 35, 35, of the ordinary type manually operable independently of each other through a suitable system of levers (not shown). Drive chains 36, 36, connect the sprockets 34, 34, with each continuous tread device 11 for driving said tread devices in the usual manner to move the main frame 10 about from working place to working place, said main frame being steered by releasing one friction clutch 35 and applying the opposite clutch 35 to release power from one continuous tread 11 and apply power on the other tread, or applying both friction clutches 35 simultaneously to apply power evenly to both continuous treads to move the main frame 10 in a straight line. Friction bands 37, 37, are provided on the outer periphery of the friction clutches 35, 35, for holding one tread 11 stationary while the opposite tread 11 is moving to pivot the main frame about said stationary tread.

The hydraulic jack 15 is of an ordinary type having a piston 40 movable in a cylinder 41 to engage a mine roof and hold the main frame 10 stationary while the material gathering mechanism is gathering loose material and is held in engagement with said mine roof by means of fluid pressure effected by the pump 27 and hydraulic system. The pump 27 is a reciprocating pump of the ordinary type well known to the art and takes fluid at a low pressure from a storage tank 42 and discharges said fluid at a high pressure to the cylinder 41 of the hydraulic jack 15 so said fluid may exert a pressure on the piston 40 to hold said piston against the mine roof. Suitable valves generally indicated at 43 of an ordinary construction are provided to provide a means for controlling the raising and lowering of the hydraulic jack 15 and allow the low pressure water to return to the storage tank 42 and thus establish a continuous water circuit from the tank 42 through the pump 27 and hydraulic jack 15 back to said storage tank. The valves 43 are controlled by suitable hand levers not herein shown since they are no part of my invention.

The chain 12 is made up of a plurality of plates 44, 44, hinged together at their ends and is driven by a sprocket 45 journaled on the forward portion of the main frame 10. The sprocket 45 is hexagonal in shape with portions cut away at the corners to receive the hinges of the chain 12 and engages the lower portion of said chain, the upper portion of said chain bearing against the sides of the main frame 10.

The sprocket 45 has an internal gear 46 fixed thereto which is driven by a pinion 47 on the lower end of a hub 48 of a bevel gear 49. The bevel gear 49 is journaled in the main frame 10 on its hub and on a vertical shaft 50 fixed in said main frame at its upper end. The bevel gear 49 is driven by a bevel pinion 51 on a longitudinal shaft 52. The longitudinal shaft 52 may be selectively driven from the motor 16 through a motor pinion 54 on the forward end of said motor which drives a spur gear 55 keyed on a longitudinal shaft 56 which spur gear meshes with and drives a spur gear 57 freely mounted on the longitudinal shaft 52, or through a spur gear 59 keyed on the opposite end of the shaft 56 from the spur gear 55 which drives an idler gear 60 which in turn drives a spur gear 61 freely mounted on the longitudinal shaft 52.

Suitable clutch means are provided to selectively connect the spur gears 57 or 61 with the longitudinal shaft 52. Said clutch means may be of any type but are herein shown as friction clutches 64 and 65 of the ordinary cone type manually operable by means of a suitable system of levers in a manner well known to the art (not shown). The clutches 64 and 65 are interconnected so that the clutch 64 is disengaged from driving the shaft 52 from the gear 57 when the clutch 65 is engaged for driving the shaft 52 from the gear 61, and vice versa. It may therefore be seen that the shaft 52 may be driven at a slow speed in one direction by means of the gear 57 or at a high speed in an opposite direction by means of the gear 61 so the material gathering paddles 14 may be driven at a slow speed in one direction while gathering loose material and may be returned at a faster speed when not under the load of moving loose material along the main frame 10.

Figures 6, 7 and 8 show the device embodying my invention gathering loose material in a mine entry. A material transporting device is provided to transport the loose material gathered by my material gathering device to a mine car or other suitable receptacle remote from said mine face. Said material transporting device is herein shown as a scraper 66 of the ordinary type having a hinged rearward end which opens as said scraper moves on its rearward journey and closes as said scraper moves forwardly, but may be any other type of material transporting device such as a conveyor of the various types generally used in coal mines. A head rope 67 is provided to move the scraper 66 forwardly away from the main frame 10 while a tail rope 68 is provided to move said scraper rearwardly toward said main frame. Said draft ropes are actuated by means of a suitable hoisting device remote from the coal face in the usual manner (not shown).

After the coal seam has been undercut and shot down in the usual manner, the draft ropes for the scraper 66 are properly arranged and my material gathering device is moved into the shot coal on its continuous treads. The roof jack 15 is set to bear against the mine roof and the material gathering paddles are reciprocated by means of the chain 12 by manually engaging the clutch 64 to move the paddles 14, 14, rearwardly along the main frame 10 at a slow speed and then engaging the clutch 65 to move said paddles forwardly along said main frame, so said paddles may return to gather a new load of loose material to transport to the rearward end of said main frame.

It should be observed that the material gathering paddles 14, 14, have a cutting edge on the outer end thereof and are pivoted to the chain 12 and extend from the top portion of said chain to a point adjacent the mine bottom and that a suitable flexible tension means herein shown as a chain 70 is provided to limit the movement of each of said paddles so said paddles may open when gathering a load of loose material and close when returning to gather a new load of said loose material, the pressure of the loose material on the rearward end of each material gathering paddle pivoting said paddle so it may lie along the chain 12 in a closed position on its return journey. It may also be seen that my material gathering device may be readily manipulated on its continuous tread devices to gather loose coal from corners of the room or entry and move it into the path of a suitable material transporting device, the roof jack 15 being disengaged from the mine roof while moving or feeding but being engaged with said mine roof while loading or gathering loose material.

While I have illustrated and described one embodiment of my invention, it will be understood that the construction of the various parts or their arrangement may be altered or changed without departing from the spirit or scope of the invention. Furthermore, I do not wish to be construed as limiting myself to the specific mechanism shown, excepting as it may be limited in the appended claims.

I claim as my invention:

1. In an apparatus of the class described, a main frame, an endless chain device reciprocably movable about said main frame comprising a plurality of relatively wide plate members pivotally connected together at their ends, a plurality of material gathering paddles having pivotal connection with said endless chain device for a portion of its length, said paddles being wider than said plate members and engaging the mine bottom, and adapted to extend outwardly from said endless chain device when moving about said main frame in one direction, and fold against said endless chain device when moving about said main frame in an opposite direction, and means for limiting the outward movement of said material gathering paddles.

2. In an apparatus of the class described, a motor, a main frame, an endless chain device reciprocably movable about said main frame comprising a plurality of relatively wide plate members pivotally connected together at their ends, a drive connection from said motor for moving said endless chain device about said main frame either continuously or reciprocably, a plurality of material gathering paddles having pivotal connection with said endless chain device for a portion of its length, said paddles being wider than said plate members and engaging the mine bottom and adapted to extend outwardly from said endless chain device when moving about said main frame in one direction, and fold against said endless chain device when moving about said main frame in an opposite direction, and means for limiting the outward movement of said material gathering paddles.

3. In an apparatus of the class described, a main frame, a plurality of laterally spaced continuous tread devices for supporting and moving said frame, an endless chain device reciprocably movable about said main frame comprising a plurality of relatively wide plate members pivotally connected together at their ends, a plurality of material gathering paddles having pivotal connection with said endless chain device for a portion of its length, said paddles being wider than said plate members and engaging the mine bottom, and adapted to extend outwardly from said endless chain device when moving about said main frame in one direction, and fold against said endless chain device when moving about said main frame in an opposite direction, and means for limiting the outward movement of said material gathering paddles.

4. In an apparatus of the class described, a motor, a main frame, a plurality of laterally spaced continuous tread devices for supporting and moving said frame, an endless chain device reciprocably movable about said main frame comprising a plurality of relatively wide plate members pivotally connected together at their ends, a drive connection from said motor for moving said endless chain device about said main frame either continuously or reciprocably, a plurality of material gathering paddles having pivotal connection with said endless chain device for a portion of its length, said paddles being wider than said plate members and engaging the mine bottom and adapted to extend outwardly from said endless chain device when moving about said main frame in one direction, and fold against said endless chain device when moving about said main frame in an opposite direction, and means for limiting the outward movement of said material gathering paddles.

5. In combination with a loading device, a main frame, a plurality of laterally spaced continuous tread devices for supporting and moving said main frame, an endless chain device reciprocably movable about said main frame, a plurality of material gathering paddles having pivotal connection with said endless chain device for a portion of its length, said paddles being wider than said endless chain device and engageable with the mine bottom and adapted to extend outwardly from said endless chain device when moving about said main frame in one direction, and fold against said endless chain device when moving about said main frame in an opposite direction, and means for limiting the outward movement of said material gathering paddles.

6. In combination with a loading device, a main frame, a motor, a plurality of laterally spaced continuous tread devices for supporting and moving said main frame, an endless chain device reciprocably movable about said main frame, a plurality of material gathering paddles having pivotal connection with said endless chain device for a portion of its length, said paddles being wider than said endless chain device and engageable with the mine bottom and adapted to extend outwardly from said endless chain device when moving about said main frame in one direction, and fold against said endless chain device when moving about said main frame in an opposite direction, means for limiting the outward movement of said material gathering paddles, a drive connection from said motor for moving said endless chain device about said main frame either continuously or reciprocably and another drive connection from said motor for driving said continuous tread devices independently of said endless chain device.

7. In combination with a loading device, a main frame, a motor, a plurality of laterally spaced continuous tread devices for supporting and moving said main frame, an endless chain device reciprocably movable about said main frame, a plurality of material gathering paddles having pivotal connection with said endless chain device for a portion of its length, said paddles being wider than said endless chain device and engageable with the mine bottom and adapted to extend outwardly from said endless chain device when moving about said main frame in one direction, and fold against said endless chain device when moving about said frame in an opposite direction, means for limiting the outward movement of said material gathering paddles, a drive connection from one end of said motor for moving said endless chain device about said main frame either continuously or reciprocably and another drive connection from the opposite end of said motor for driving said continuous tread devices independently or simultaneously of each other and independently of said endless chain device.

Signed at Chicago, in the county of Cook and State of Illinois, this 18th day of October, A. D. 1928.

ALFRED B. ESSELTINE.